June 4, 1929.　　　D. E. WASHINGTON　　　1,715,729
DRIER
Filed July 25, 1927　　　2 Sheets-Sheet 2

INVENTOR.
Dixon E. Washington
BY
ATTORNEY.

Patented June 4, 1929.

1,715,729

UNITED STATES PATENT OFFICE.

DIXON E. WASHINGTON, OF KANSAS CITY, MISSOURI, ASSIGNOR OF ONE-HALF TO WILLARD B. CONNELL, OF KANSAS CITY, KANSAS.

DRIER.

Application filed July 25, 1927. Serial No. 208,287.

This invention relates to improvements in driers of the rotary type, and the primary object is to produce a drier which is provided with a revolvable drum having an axial and a circumferentially arranged bearing.

Another object of this invention is the provision of a drier having a revolvable drum comprising two spaced apart cylinders, the inner cylinder having a re-inforcing spiral rib on its outer periphery.

A further object of the instant invention is the contemplation of a revolvable drum having an aperture in its side wall and a gravity actuated closure adapted to alternately open and close said apertures as the drum is rotated.

A still further object of this invention is the provision of a revolvable drum having a revolvable heating barrel axially disposed therein said barrel having agitators and longitudinal ribs carried thereby.

Other objects are simplicity of construction, rapidity of drying, and ease of operation.

Minor objects will appear during the course of the detailed specification referring to the accompanying drawings, in which Figure 1, is a side elevation of a drier embodying this invention parts being broken away for clearness.

Figure 1:
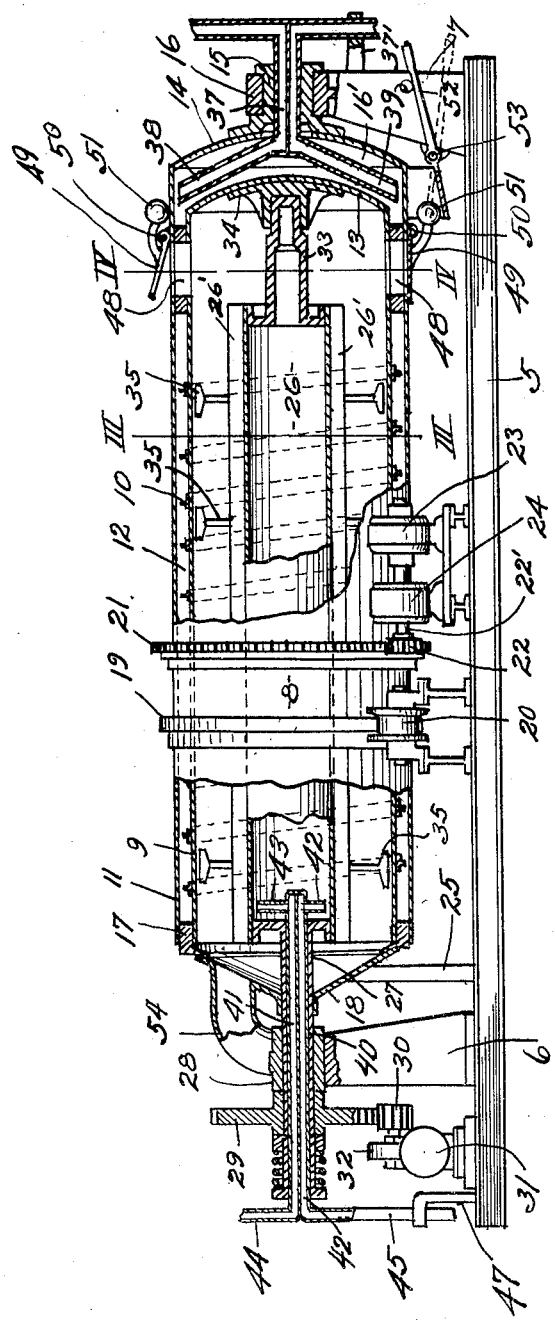
Figure 2:
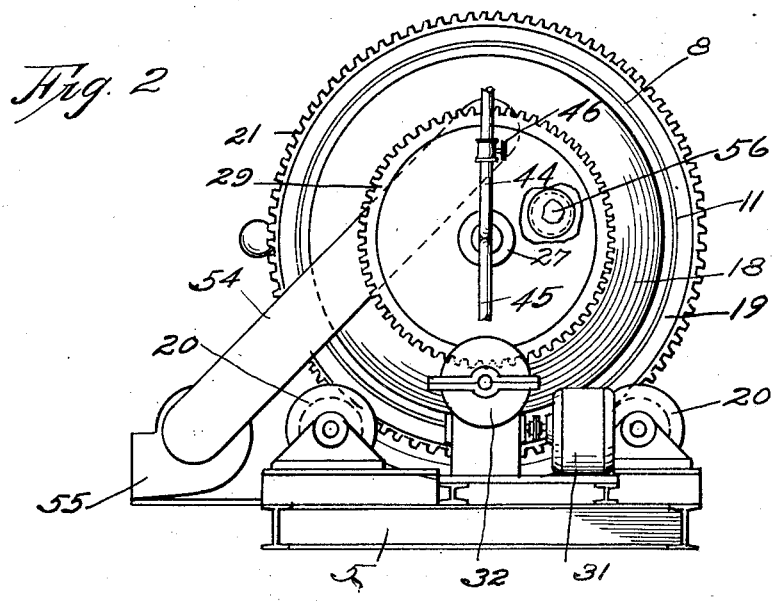
Fig. 2, is an enlarged end elevation of the same.
Figure 3:
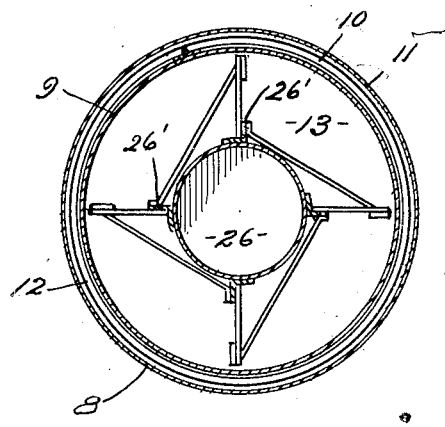
Fig. 3, is an enlarged cross-section taken on line III—III of Fig. 1, with parts omitted.
Figure 4:
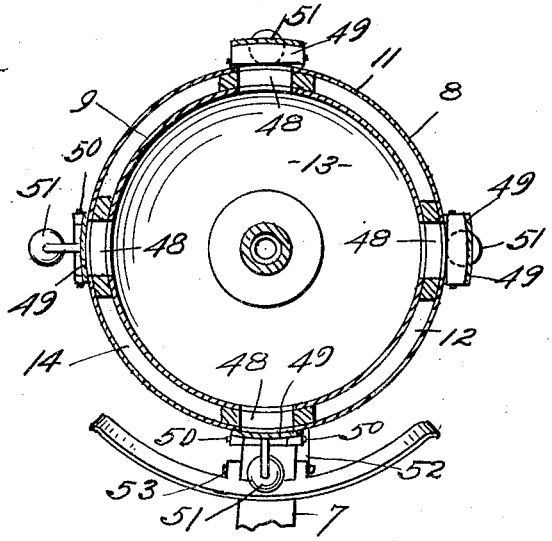
Fig. 4, is an enlarged cross-section on line IV—IV of Fig. 1.

Referring now to the drawings in detail wherein similar reference characters refer to like parts throughout the several views, the numeral 5 designates a suitable framework on which are mounted standards 6 and 7 rotatably carrying a drum 8 comprising an inner casing 9 having a spirally arranged re-inforcing rib 10 on its periphery, and an outer casing 11 rigidly attached to the inner casing 9 and concentric therewith, said outer casing being spaced from spiral rib 10, thus forming a steam chamber 12, which extends substantially the full length of said drum. One end of the inner casing 9 is entirely closed by a spherical end member 13, while the end of the outer casing 11, adjacent said end member 13 is provided with a spherical similar end member 14, to which is rigidly attached a hollow axial trunnion 15 rotatably mounted in bearing 16 carried by standard 7. End members 13 and 14 are spaced apart to form an end chamber 16' for the purpose hereinafter fully set forth.

The other end of casings 8 and 9 are co-extensive and are adapted to receive the ring member 17 rigidly secured therebetween. Ring 17 is concentric with casings 8 and 9 and is adapted to fit therebetween, to form a closure and spacer to prevent the escape of the contents of chamber 12. As shown in Fig. 1, ring 17 is extended slightly to provide an overlapping portion which slidably engages end member 18 to form a sliding fit or joint which may be provided with suitable lubrication.

Adjacent the end member 18 and securely attached to the outer casing 11 of drum 8 is a ring 19, which is adapted to bear on flanged rollers 20 carried by frame 5. Concentric with outer casing 11 and securely affixed thereto is a ring gear 21 operably engaged by a pinion 22, mounted on shaft 22', and driven by motor 23 through transmission 24 in the usual manner. Stationary end 18 of drum 8 is held against rotation by means of a bracket 25.

Rotatably mounted within inner casing 9 and axially disposed therein, is a barrel 26 having one end entirely closed, while the other end thereof is provided with a hollow trunnion 27 passing through stationary end member 18 and rotatably journaled in bearing 28 carried by standard 6. Drivingly mounted on trunnion 27 in any suitable manner is a spur gear 29 which is adapted to be driven by pinion 30 which in turn is driven by motor 31 through the gear reducing mechanism 32. The inner end of barrel 26, which is adjacent the end member 13 of inner casing 9 is provided with a trunnion 33, rotatably mounted in a bearing 34 carried by end member 13. In order that the drying zone be varied as desired, the driving mechanisms of barrel 26 and drum 8 are so constructed and regulated that the speed of rotation of barrel 26 is in the same or opposite direction and greater or less than that of drum 8. By thus varying the speeds material is exposed to a greater or less amount of heat.

Mounted on the periphery of barrel 26 is a plurality of longitudinal ribs 26' which may extend the entire length thereof. These ribs, in combination with the barrel, serve to form channels in which a portion of the material to be dried is deposited when the drier is in operation. In juxtaposition with the internal periphery of casing 9 is a series of agitators 35 carried by barrel 26, and rotatable therewith.

In order to supply the steam chamber 12 with a suitable amount of steam, and also provide an exit for the condensate, a horizontally partitioned tube 37 is mounted in the hollow trunnion 15, the upper and lower chambers of which joins an upwardly extending tube 38, and a downwardly extending tube 39 respectively. The outer end of tube 37 is also provided with upwardly and downwardly extending tubes which connect with the upper and lower chambers of pipe 37 respectively. Steam is admitted to the chamber 12 through the pipe 38, and the condensate which collects at the bottom of chamber 12 may be removed through pipe 39. Tube 37 is secured against rotation by means of bracket 37', which is securely attached to standard 7.

Mounted within hollow trunnion 27, and concentric therewith is a horizontally divided tube 40 having upper chamber 41 and lower chamber 42. Tube 40 extends within the barrel 26, and is provided with an upwardly extending tube 43, and a downwardly extending tube 42, which are connected with the upper and lower chambers of tube 40, respectively. The outer end of tube 40 is also provided with laterally extending tubes 44 and 45, joined with the upper and lower chambers of tube 40 respectively. The tube 44 is provided with a suitable control valve 46, and bracket 47, carried by frame 5, engages tube 45, thereby preventing rotation of tube 40.

When the drier is in operation, steam is admitted through tube 44, when valve 46 is opened, passes through the upper chamber of tube 40, thence through tube 43, and into the barrel 26. Condensate collects in the lower part of barrel 26, and may be drawn off through tube 42, the lower chamber of tube 40, thence through tube 45. Drum 8 is provided with a series of circumferentially arranged apertures 48, each of said apertures being provided with a gravity operated closure 49, pivoted at 50 on drum 8, and provided with a gravity weight 51, so positioned as to normally open and close said corresponding aperture as the drum 8 is rotated. It will be noted that the closure member is so constructed and positioned as to open the aperture 48 when said aperture is above the horizonal axial plane of drum 8, and will close the same when it is below said plane.

In order to open closures 49, to discharge the contents of inner casing 9, through the lower aperture 48, an operating lever 52, pivoted at 53 on standard 7 is provided. The inner end of said lever is arcuate in form, and when in the raised position as shown in dotted lines in Figure 1, is adapted to engage gravity weights 51, and thus support said weights to prevent them from closing apertures 48. Material to be dried may be deposited in the drying chamber through filler opening 56 which may be provided in end 18, and fresh air enters the open apertures 48, to pass through the drying zone in drum 8 from whence it leaves through tube 54, connecting stationary end 18 with an exhaust fan 55.

It will be noted in Fig. 1, that tubes 38 and 39 are positioned in end chamber 16' which permits the drum 8 to be rotated while the tubes remain stationary.

This invention is not limited to the specific construction shown and described, as many modifications within the scope of the appended claims may be made without departing from the spirit thereof.

What is claimed as new and desired to be secured by Letters Patent is:

1. In a rotary drier, a revolvable drum having an axial and a circumferentially arranged bearing, a revolvable heating barrel axially disposed within said drum and means for rotating said drum and barrel independently.

2. In a rotary drier, a revolvable drum comprising two spaced apart concentric cylinders and two ends, one end of said drum being integral and rotatable therewith and the other end of said drum being stationary and slidably joined with said cylinders.

3. In a rotary drier, an inner revoluble cylinder having a spiral reinforcing rib on its outer periphery, an outer revoluble cylinder rigidly attached to said inner cylinder and spaced from said rib, and two end members, one of said end members being rigidly attached to said cylinders and revoluble therewith, the other end member being stationary and slidably joined with said cylinders.

4. In a rotary drier, a revolvable drum, a revolvable heating barrel axially disposed within said drum with a plurality of ribs carried on its circumference parallel to the axis of the barrel, and agitators carried by and extending from said barrel.

5. In a rotary drier, a rotatably mounted drum, having an aperture in its outer wall and a gravity actuated closure carried by said drum adapted to close said aperture when the same is below the horizontal axial plane of said drum, and selective means to preclude the operation of gravity operable closure from acting to close said aperture.

In testimony whereof, I hereunto affix my signature.

DIXON E. WASHINGTON.